United States Patent [19]

Speer et al.

[11] Patent Number: 5,067,887
[45] Date of Patent: Nov. 26, 1991

[54] HOT-MELT ADHESIVE RECYCLING SYSTEM

[75] Inventors: Howard D. Speer, Marriottsville; Robert A. Shortt, Baltimore, both of Md.

[73] Assignee: Black & Decker Inc., Newark, Del.

[21] Appl. No.: 664,268

[22] Filed: Mar. 4, 1991

Related U.S. Application Data

[63] Continuation of Ser. No. 82,474, Aug. 7, 1987, abandoned.

[51] Int. Cl.⁵ .................... B29C 33/40; B29C 33/50; B29C 39/36
[52] U.S. Cl. .................... 425/256; 249/120; 249/127; 249/173; 264/37; 425/440; 425/DIG. 44
[58] Field of Search ............... 249/120, 127, 139, 134, 249/173, 148, 183; 425/542, 256, 440, 803, DIG. 44; 264/DIG. 69, DIG. 44, 37; 222/146.5

[56] References Cited

U.S. PATENT DOCUMENTS

| | | | |
|---|---|---|---|
| 1,688,888 | 8/1926 | Spreen | 249/120 |
| 1,873,081 | 11/1930 | Von Witzki | 249/120 |
| 3,104,665 | 3/1959 | Towns | 604/288 |
| 3,527,439 | 9/1970 | Lawnmaster | 249/173 |
| 3,917,123 | 11/1975 | Grenfell | 222/146.5 |
| 3,934,809 | 1/1976 | Fox et al. | 249/117 |
| 3,934,810 | 1/1976 | Henning | 249/117 |
| 3,937,438 | 2/1976 | Fox et al. | 249/117 |
| 4,028,458 | 6/1977 | Wallace | 264/148 |
| 4,093,175 | 6/1978 | Putzer et al. | 249/177 |
| 4,379,516 | 4/1983 | Barlogis | 222/146.5 |

Primary Examiner—Jay H. Woo
Assistant Examiner—K. P. Nguyen
Attorney, Agent, or Firm—Dennis A. Dearing; Charles E. Yocum; Edward D. C. Bartlett

[57] ABSTRACT

A system for recovering hot-melt materials for reuse in a glue gun includes a flexible mold form mounted in a carrier and having an internal cavity that approximates the dimensions of the preformed hot-melt sticks. In order to change from one type hot-melt material to another, the sticks of the desired material are loaded into the gun while the heated, hot-melt material in the gun is discharged into the mold form. The hot-melt material flows into the mold form and assumes the shape of a conventional preformed stick. After cooling and solidification of the material, the mold form is removed from its carrier and the cooled, cast stick is removed from the mold form for reuse. The mold form is fabricated from a flexible, heat-resistant material, such as a silicone rubber, and includes an elongated tubular portion having a tapered exterior to facilitate removal from its carrier and an internal bore dimensioned to produce a cast stick having the dimensions of the preformed stick. The system advantageously allows recycling hot-melt material purged from a glue gun when changing over from one type of hot-melt material to another.

8 Claims, 2 Drawing Sheets

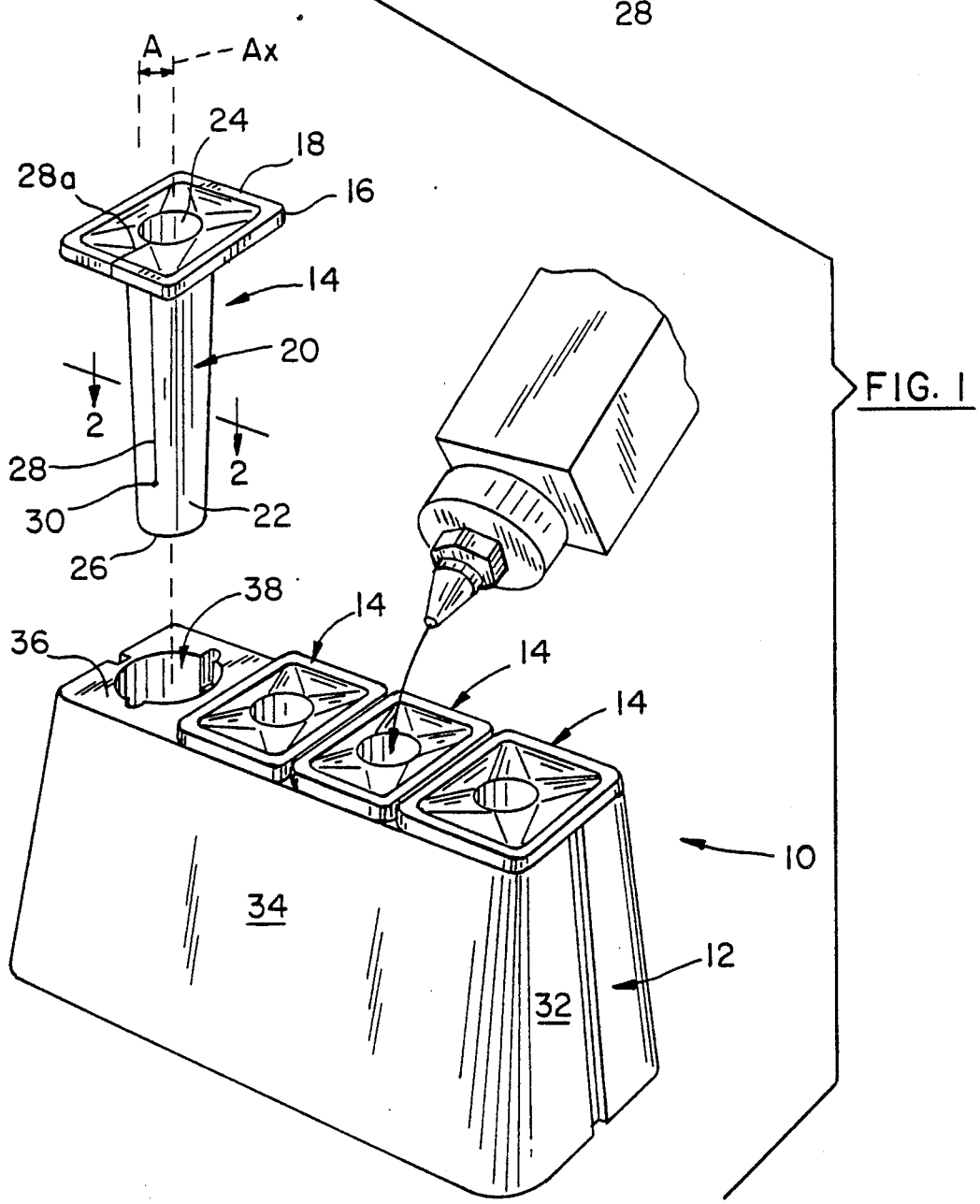

HOT-MELT ADHESIVE RECYCLING SYSTEM

This application is a continuation of application Ser. No. 07/082,474, filed Aug. 7, 1987, now abandoned.

BACKGROUND OF THE INVENTION

The present invention relates to hot-melt adhesives and, more particularly, to the recycling of hot-melt adhesives and similar thermoplastic materials commonly used in electric hot-melt adhesive dispensing guns.

Hot-melt adhesive dispensing guns, commonly known as glue guns, have achieved widespread use in the consumer market where they are used to effect common household repairs. The guns typically include a body portion having an internal electric heater and an integral handle that is grasped by the user. Solid adhesive or caulking materials in the form of short, cylindrical sticks (typically two or four inches in length and 0.5 inches in diameter) are loaded into the gun through an entry port and melted by the heater for discharge through a nozzle. A typical gun has the internal capacity to accommodate two to four two-inch sticks in a molten state for discharge through the nozzle. In order to change from one type of thermoplastic material, e.g., from a traditional adhesive to a caulking material, the contents of the gun must first be purged. This can be accomplished by loading the gun with two or three sticks of the desired material and continuously discharging the hot contents of the gun until the internal passages and cavities of the gun are purged of the former material and filled with the desired material. As can be appreciated, frequent changeover from one material to another is both time consuming and wasteful. The inconvenience associated with a changeover limits the variety of materials that can be used with traditional hot-melt glue guns. While hot-melt adhesives can be fabricated in different compositions for different purposes, for example, adhesives for adhering cloth, stone, metal, glass, etc., and caulks in different colors or compositions, the waste associated with the need to purge the prior contents of the gun represents a practical limit of the ability to market a wide variety of adhesive and caulk compositions.

SUMMARY OF THE INVENTION

In view of the above, it is an object of the present invention, among others, to provide a system and method for the recycling of hot-melt materials discharged from hot-melt dispensing guns as a consequence of changeover from one type of material to another.

It is another object of the present invention to provide a system and method for recovering hot-melt materials discharged from glue guns and recycling the recovered material in stick form for reuse.

In view of these objects, and others, the present invention provides a system and method for recovering hot-melt materials for reuse. A mold apparatus includes a mold form having an internal cavity that approximates the dimensions of the preformed hot-melt sticks. The mold form is fabricated from a flexible material that does not adhere to the various hot-melt materials. A carrier is provided to support the mold form during the recovery of the hot-melt material. As part of the process of purging a glue gun, the solid, preformed sticks of the desired material are loaded into the gun while the heated, undesired hot-melt material is discharged into the mold form. The hot-melt material flows into the mold form and assumes the shape of a conventional preformed stick. After cooling and solidification of the material, the mold form is removed from its carrier and the cooled stick is separated from the flexible mold form for reuse.

In the preferred embodiment, the mold form is fabricated from a flexible, heat-resistant material, such as a silicone rubber, and includes an elongated tubular portion having a tapered exterior and a cylindrical internal bore dimensioned to produce a cast stick having the dimensions of a conventional preformed stick. A flange is formed at one end of the mold form to allow the mold form to be inserted into the receiving opening of a carrier designed to carry a plurality of mold forms, the number of mold forms being sufficient to accommodate the entire internal capacity of the glue gun during changeover from one type of hot-melt material to another The present invention advantageously addresses the problem of recycling hot-melt material purged from a glue gun when changing-over from one type of hot-melt material to another and, from a practical standpoint, allows for the marketing of a wider variety of specialized hot-melt materials.

Other objects and further scope of applicability of the present invention will become apparent from the detailed description to follow, taken in conjunction with the accompanying drawings, in which like parts are designated by like reference characters.

BRIEF DESCRIPTION OF THE DRAWING

FIG. 1 is a perspective view of a hot melt recycling system in accordance with the present invention illustrating an exemplary four-stick mold form carrier;

FIG. 2 is a detail cross-sectional view of a mold form taken along line 2—2 of FIG. 1.

DESCRIPTION OF THE PREFERRED EMBODIMENT

Figure 3:
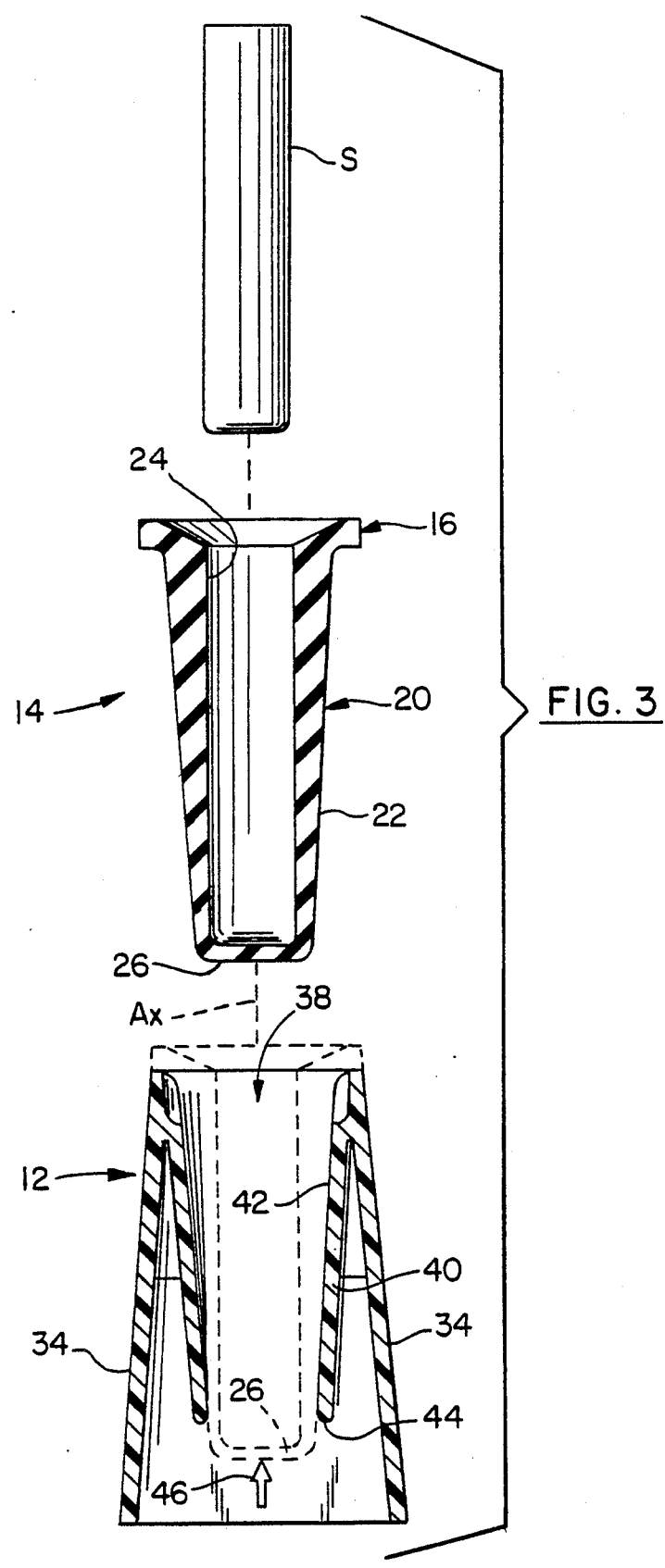
FIG. 3 is a vertically exploded view of a mold form removed from its carrier and a cast hot-melt material stick suitable for reuse in a hot-melt dispensing gun.

An exemplary hot-melt recycling system in accordance with the present invention is shown in FIG. 1 and designated generally therein by the reference character 10. As shown, the system 10 includes a base-like carrier 12 and a plurality of mold forms 14 of which one is shown removed from the carrier 12 for reasons of clarity. Each mold form 14 includes a generally rectangular flange 16 at one end defined by a peripheral rim 18. A tube-like portion 20 extends downwardly from the flange 16 and, as shown in FIGS. 2 and 3, includes an outer surface 22, an inner surface 24, and a closed bottom end 26. The outer surface 22 is a surface of revolution about the longitudinal axis $A_x$ of the mold form 14 and is formed so as to taper relative the axis $A_x$, an angle A of 8° being preferred for a total included angle of 16°. Accordingly, the outer surface 22 defines a truncated cone that converges in the direction of the bottom end 26. The inner surface 24 is formed as a cylindrical surface of revolution about the axis $A_x$ and has a nominal diameter of about 0.5 inches and an overall length of about two inches, these dimensions being consistent with those used for preformed adhesive and caulk hot-melt sticks commonly used in consumer glue guns. The tube-like portion 20 is provided with a slit 28 on one side along a major portion of its length with the slit 28 terminating in a small, circular stress-relief bore 30. The slit 28 is continuous through the flange 16 as indicated at 28a in FIG. 1. The mold form 14 is fabricated from a flexible, temperature resistant material that has a low surface adhesion to the range of available hot-melt materials. In general, a flexible RTV-type silicone is preferred.

The carrier 12 includes end and side walls 32 and 34 and an upper support surface 36 that includes an opening 38 for each of the mold forms 14. As shown in the cross-sectional view of FIG. 3, the carrier 12 is formed with an interior, downwardly converging conical section 40 that has an inner surface 42 formed as a surface of revolution about the axis Ax and dimensioned to receive the mold form 14 in a resilient line-to-line fit. As shown in FIG. 3, the conical section 40 has a rim 44 at its lower end that is dimensioned to allow the bottom end 26 of the mold form 14 to extend therebelow to allow each mold form 14 to be pushed out of the carrier 12 by application of a force in the direction of the arrow 46.

In order to use the system 10 of FIGS. 1–3 to recover and recycle hot-melt materials, a hot-melt dispensing gun 50 is positioned to discharge its supply of hot-melt material, e.g., an adhesive or a caulk, in the open top of the mold form 14. The hot, viscous material enters the mold form 14 and accumulates to fill the cavity defined by the inner surface 24 and the bottom end 26 of the mold form 14. The heat conductivity of the typically silicone material is such to conserve heat and thus insure complete filling of the mold form 14. Since most commercial hot-melt dispensing guns have an internal capacity equivalent to four preformed sticks, the hot-melt dispensing gun 50 is used to fill all four mold forms 14. The hot material is then allowed to cool and solidify, a 30 to 60 minute cooling period at room temperature generally being sufficient. After the recovered material has solidified, the carrier 12 is grasped with one hand and one or more of the mold forms 14 are removed by applying a force, e.g., for example, with the fingers of the other hand, to the bottom ends 26 of the mold forms 14 to push them upwardly and out of the carrier 12. Thereafter, the portions of the flange 16 on the opposite sides of the slit 28 are pulled to separate the flexible sides of the mold form 14 to allow a cast stick S (FIG. 3) to be pulled from the mold form 14. As can be appreciated, the stick S is properly dimensioned for reuse in the hot-melt dispensing gun 50.

The present invention advantageously addresses the problem of recycling hot-melt material purged from a glue gun when changing-over from one type of hot-melt material to another and eliminate waste often associated with changeover.

Thus it will be appreciated from the above that as a result of the present invention, a hot-melt adhesive recycling system and method is provided by which the principal objectives, among others, are completely fulfilled. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims and their legal equivalent.

What is claimed is:

1. A hot-melt material recycling system for the recovery of hot-melt material and the forming of the recovered material into solid preforms, the system comprising:
    a hot-melt dispensing apparatus for receiving a solid hot-melt material preform formed as a cylinder about a longitudinal axis and having a diameter dimension equal to D and a length dimension equal to L, heating the preform to a flowable state, and dispensing the heated material therefrom;
    a flexible mold form for receiving dispensed hot-melt material and defining a cylindrical cavity therein having a diameter dimension equal to D and a length dimension equal to L for molding the material into a hot-melt material preform having a diameter dimension equal to D and a length dimension equal to L for re-use in said hot-melt dispensing apparatus;
    a mold carrier for holding said flexible mold form;
    said flexible mold form comprising a wall portion having an interior surface and an exterior surface, the interior surface defining the cylindrical cavity, the cavity having an open end for receiving the dispensed hot-melt material and having a closed end, a peripheral flange extending around the open end;
    said wall portion having a longitudinally slit along a side thereof, a lower end of said slit terminating in a bore adjacent said cylindrical cavity closed end, an upper end of said slit being open and extending through said flange;
    said mold carrier comprising a base member including a conically shaped cavity having a top opening for receiving said flexible mold form, the base member cavity being shaped to receive the exterior surface of said flexible mold form and constrict said longitudinal slit so as to seal said flexible mold form, the base member cavity having another opening at the opposite end thereof from said top opening;
    said exterior surface of said flexible mold wall portion defining a conical surface of revolution about said longitudinal axis, the conical surface having an included angle of 16 degrees; and
    said flexible mold form when received in said base member cavity extending partially through said another opening of said base member cavity with the closed end of the mold form cylindrical cavity being spaced below said another opening of said base member cavity.

2. A mold form and carrier apparatus for casting a hot-melt adhesive stick, comprising:
    a flexible mold form having an upper open end, a closed bottom end, and an inner surface defining a cylindrical surface of revolution about a longitudinal axis;
    said flexible mold having a slit longitudinally along one side thereof from said open end to a location intermediate said open end and said bottom end;
    said flexible mold form being fabricated of a flexible material having a low surface adhesion to hot-melt adhesive;
    a mold carrier supporting said flexible mold form and including an open cavity shaped to receive an outer surface of said flexible mold form and to constrict said longitudinal slit to seal said flexible mold form;

said exterior surface of said wall portion defining a conical surface of revolution about said longitudinal axis;

said mold carrier comprising a base member having a conically shaped cavity having a top opening for receiving and through which downwardly extends said flexible mold form and bottom smaller opening through which a lower portion of said flexible mold form protrudes downwardly; and said flexible mold form having an outwardly directed flange around said upper open end, said flange overlying an upper surface of said mold carrier, and said slit extending outwardly through said flange from said one side of said flexible mold form.

3. An apparatus for casting hot-melt preparation sticks, the apparatus comprising:

a flexible mold form comprising a tubular flexible jacket having a side wall defining a cylindrical cavity formed about a longitudinally extending axis, the cylindrical cavity having an upper open end, a closed lower end, and a peripheral flange portion around said upper open end;

said flexible jacket including a longitudinal slit in said side wall and extending along a major portion of the length of said jacket through and from said flange, the slit enabling deformation of the flexible jacket to ease extraction of cast hot-melt preparation sticks therefrom;

said flexible mold form being made of a flexible silicone material having a low surface adhesion to hot-melt adhesive;

said side wall having an exterior surface that defines a truncated cone about said longitudinally extending axis, said truncated cone tapering downwardly and inwardly from said upper open end to said closed lower end;

said slit being terminated at an end remote from said flange by a bore for relieving stress at that end;

a support carrier comprising a base member having an opening in an upper surface thereof with an inner wall portion extending downwardly from said opening and defining a frusto-conical cavity receiving said mold form;

a lower end of said frusto-conical having an opening through which the mold form protrudes and is accessible for upward removal from said base member, said inner wall portion engaging substantially the entire outer surface area of the side wall of said flexible jacket; and said support carrier having an outer wall extending downwardly and outwardly from said upper surface, said outer wall surrounding said inner wall portion and extending downwardly lower than said inner wall portion and said closed lower end of said cylindrical cavity.

4. An apparatus for recovering purged hot-melt material for re-use, comprising:

a base-like, self supporting carrier having an upper surface from which downwardly extends outer side walls and outer end walls, said side walls extending lengthwise in a lengthwise direction of said carrier, said side walls extending in a transverse direction of said carrier;

said upper surface having therethrough a plurality of openings spaced apart in said lengthwise direction;

an interior, downwardly converging conical section extending downwardly between said side and end walls from each of said plurality of openings, each said conical section having an open lower end spaced upwardly above lower edges of said side and end walls;

a plurality of mold forms removably received through said plurality of openings;

the mold forms being made of a flexible, heat-resistant material;

each of said mold forms having an open top end and a closed bottom end with a tube-like portion between said top and bottom ends, said top end being surrounded by an outwardly extending, rectangular flange;

each said tube-like portion having an inner cylindrical surface surrounded by an outer, downwardly converging, truncated conical surface;

each mold form having a slit through its flange, the slit extending down the tube-like portion of the mold form and terminating in a circular stress-relief bore above the closed bottom end of the mold form; and each mold form being received in the respective conical section of said carrier in a resilient line-to-line fit with the closed bottom end of each mold form extending through and below the open lower end of the respective conical section to facilitate removal of the mold form from the respective conical section.

5. The apparatus of claim 4, wherein said flexible, heat-resistant material is silicone rubber.

6. The apparatus of claim 5, wherein said outer, truncated conical surface is formed from a conical surface of revolution having a total included angle of 16 degrees.

7. The apparatus of claim 4, further including a hot-melt dispensing gun having an internal capacity equivalent to that of the plurality of mold forms, whereby the plurality of mold forms can accept the capacity of the hot-melt dispensing gun.

8. The apparatus of claim 4, wherein said plurality is four, said mold forms when filled with purged hot-melt material enable four pre-formed sticks of hot-melt material to be produced, and further including a hot-melt dispensing gun having an internal capacity equivalent to the four pre-formed sticks of hot-melt material.

* * * * *